Patented Aug. 6, 1929.

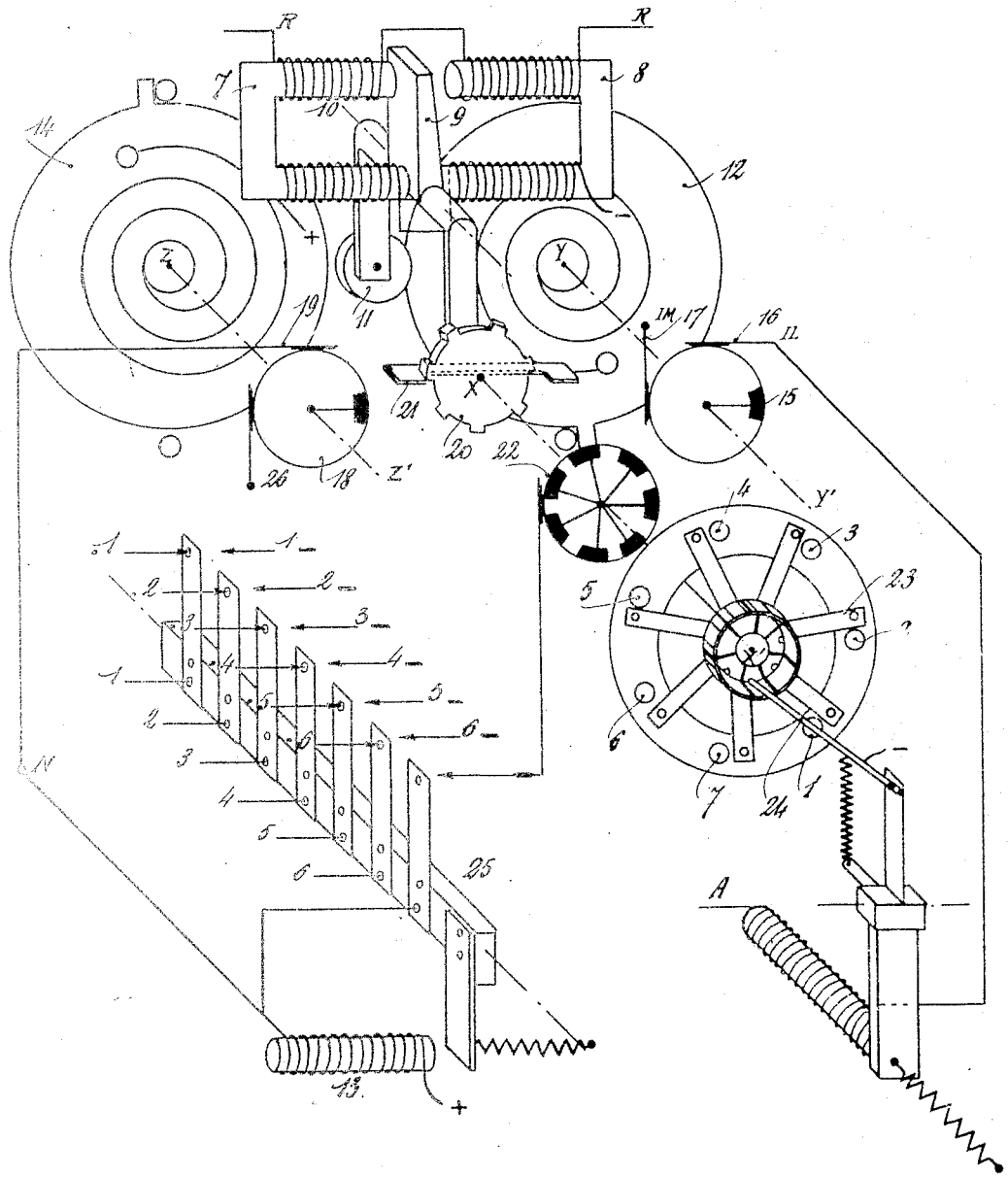
Fig. 1.

1,723,250

UNITED STATES PATENT OFFICE.

ROBERT EMILE MARIE PÉNOT, OF LA SAULAIE PAR BETZ LE CHATEAU, FRANCE.

AUTOMATIC TRANSCRIBER AND RECORDER OF TELEGRAPHIC SIGNALS.

Application filed May 25, 1926, Serial No. 111,547, and in France May 28, 1925.

The present invention relates to new and useful improvements in the automatic recorder described in my prior application Serial No. 678,646.

In said prior application Serial No. 678,646 the regulator sends through the short or long line of the distributor, a current of limited duration and of constant value necessary for its regular functioning since the spindles of this distributor are actuated successively one by the other.

One object of the invention is to provide a regulator such that on each signal (dot or dash) it closes a circuit for the local current through the spindle of the distributor corresponding to this signal. By this means the relays actuating the spindles are isolated from one another and one spindle only can function for one signal.

A further object of the invention is to provide the automatic register according to the invention apparatus which combines a regulator as described above with a commutator for the letters analogous to the distributor described in my application Serial No. 678,-646 but acting in a more simple manner and a typewriter acting on the same principle as that described in my prior application but comprising a system of inversion which simplifies its construction.

The accompanying drawings show by way of example the manner in which improvements may be effected.

Figure 1 is a diagrammatic perspective view of the regulator.

Figure 2:
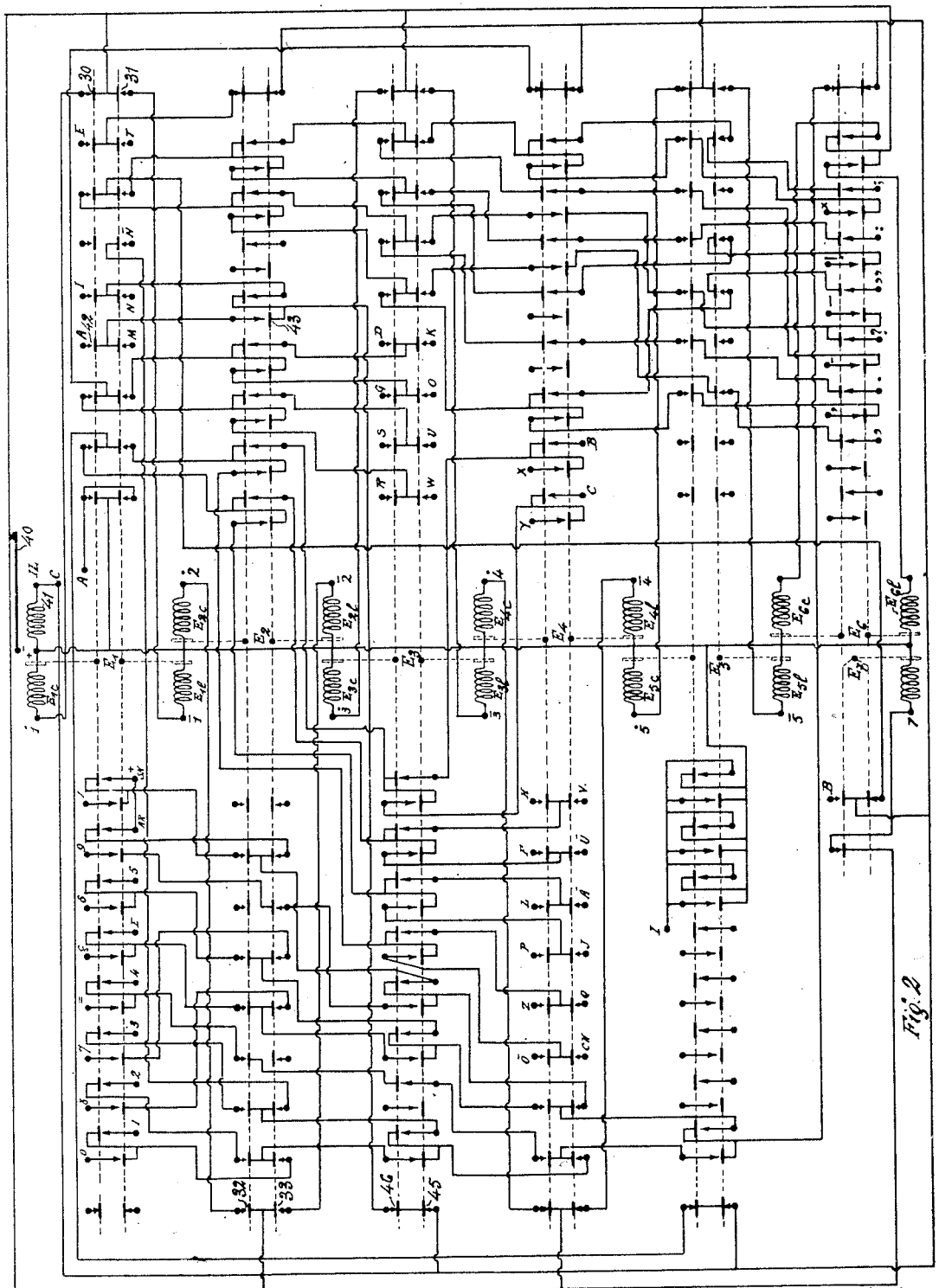
Figure 2 is a diagram of the electrical connections of the commutator for the letters.

The regulator shown in Figure 1 comprises the following elements:

1. A polarized relay 7, 8, the field for which is provided by a local source of current and the upper coils of which are included in a receiving circuit (relay and amplifier).

2. An armature 9 pivoting about a spindle 10 is located in the field of the poles 7, 8 of the relay. It is attracted to the pole 7 of the relay during a period of silence and to the pole 8 during a signal. This armature carries a friction roller 11 coupled by means of gearing to an electric motor, not shown in the drawings. This roller contacts during each period of silence with a disc 12 and each time a signal is sent with a disc 14.

3. The disc 12 actuating a commutator 15 estimates the duration of the period of silence. For a silence between letters it closes the negative pole of the source through the brush 16 (impression of the character selected and returned to the initial point of the arrangement). For a silence between words it closes the circuit through the negative pole and the brush 17 (space).

4. The disc 14 actuating a commutator 18 estimates the duration of the signal. For a short signal no contact is closed. For a long signal it closes a circuit through the negative pole by means of the brush 19 and the electromagnet 13 connected to the positive pole of the source of current.

5. An arrangement is mounted on a spindle X, X' and coupled by means of a friction clutch with the electric motor above mentioned said arrangement comprising an escapement wheel 20 controlled by the armature 9 by means of an escapement lever 21, an interlocking commutator 22 and a signal distributor 23.

This arrangement is moved through 1/14 of a revolution on the arrival of a signal and by 1/14 of a revolution at the end of this signal. Thus for seven signals it will effect a complete revolution. The signals distributor 23 is formed by a fixed rim of insulating material carrying seven conducting contacts numbered 1 to 7. Seven sliding brushes mounted on seven brass supports insulated from one another around a core of ebonite are in turn brought into operation by a switcher 24 which penetrates the hole in the brass support of the brush in operation and connects it to the negative pole of the local source of current, the six other brushes being insulated from this source.

On arrival of a signal the spindle X, X' turns through 1/14 of a revolution and the brush connected to the negative pole by the switcher 24 passes from its position of rest into the operative position. On the termination of the signal it passes from the operative position to the next rest position closing the negative pole through the contact 1 on the fixed rim. On the following signal it will close the negative pole, through the contacts 2, 3, 4 etc. When there is a silence, simultaneously with printing being effected, the switcher is withdrawn from the hole in which it is inserted and under the action of a flat spring restoring it to the plane of the spindle X, X' and of a helical spring pulling it downwards, it is automatically placed in the hole of the support of the brush which is at the starting point in order to connect it to the negative pole. The classification of the signals forming the following letter will be thus taken up by the contact 1 of the rim. The point A of the electromagnet actuating the switcher is connected to the positive pole of the source of current at the classification of the first signals by the distributor or commutator for the letters.

6. A signal selector 25 formed of an insulating element pivoting about a spindle under the action of an electro-magnet 13 carries six springs connected electrically to the six first contacts of the rim of the signals distributor 23. These springs are, when at rest, in contact with the screws dot 1, dot 2, dot 3, etc., connected to the electromagnets actuating the short spindles of the letter commutator. For a short signal the local current will thus be directed to the short spindles of the letter commutator. For a long signal the disc 14 is moved through a large angle and the commutator 18 closes the circuit through the negative pole and the brush 19. The electromagnet 13 causes the signal selector 25 to pivot thus closing the contacts through the screws dash 1, dash 2, dash 3 and the local current is consequently transmitted to the long spindle.

The signal selector 25 is retained in the operative position during the entire passage of the brush in operation over one of the contacts on the rim of the signal distributor 23 by means of a seventh contact and by the interlocking commutator 22. The signal selector returns into the short position as soon as the arrangement mounted on the spindle X, X' is in position of rest.

The seventh contact on the rim of the signal distributor engages, in the case of any inaccuracy with the spindle for returning the letter commutator to zero causing the impression of the signal "mistake". This spindle is the sixth one in the prior application as in that arrangement the distributor is only arranged to select letters and figures.

Instead of using a signal selector a second rim on the signal distributor may be used opposite the first rim and on which the brushes will be projected in the case a dash being signalled. Interlocking will be effected in the same manner as for the signal selector.

The brush 26 of the commutator 18 allows of the speed of the motor being automatically regulated with respect to the speed of reception.

When the angle of displacement for a dash is very great a current passes through the brush 26. This current actuates, by means of a relay, the excitation rheostat of the motor, the velocity of which is reduced. On the succeeding dash the excitation is returned to normal to be reduced again if this dash moves the collector through an angle which is still too great.

The regulator thus formed actuates a letter commutator constructed in the following manner.

It comprises six groups of relays $E_1$, $E_2$, $E_3$, $E_4$, $E_5$, $E_6$, each one respectively comprising two relays having multiple contacts hereinafter termed armatures.

The seventh relay $E_7$ serves to return the commutator to rest in the case of confusion and to suppress an error in the signal.

The multiple contacts of these different relays are controlled by the movable armatures of these relays.

Each sign, after having actuated the regulator, is transmitted to the group and to the corresponding spindle of the letter commutator. Each spindle of the letter commutator which has been actuated is electrically locked in the operative position by a local circuit closed for the first group by the contacts 30 and 31, for the second group by 32, 33, for the third group by 34, 35 etc.; in such a way that the signals forming a similar combination are classified on the various groups of this letter commutator according to their nature and order of arrival.

The letter commutator by means of its system of contacts and circuits only prepares for each combination the circuit corresponding to this combination, and allows a current to be transmitted to the printing machine which will control the striking of the character received as soon as an interval between the letters is estimated by the regulator.

The contacts and circuits are arranged so that the "short" armature $E_{1a}$ of the first group, (actuated by short impulses) and the "long" armature $E_{1b}$ of the first group, (actuated by long impulses) close a first break in the circuits of those letters, numerals or characters which begin respectively with a short or a long impulse as the first sign.

The "short" or "long" armatures of the second group open the circuits of the letters only having one sign and close a second break in the circuits of the letters, numerals or signs having the sign received as the second sign and so forth. The combination of the armatures is such that when a new armature is engaged the preceding circuit is broken and a new circuit prepared.

A circuit breaker 40 actuated by an electromagnet 41, the circuit of which is closed at the moment when the regulator estimates an interval between letters, breaks the interlocking circuit in order to return the armatures which have classified the preceding combination to rest.

The typewriter or printing machine associated with the regulator and commutator described above is analogous to that described in my prior application. It is composed essentially of a series of 30 relays connected electrically to the circuits of the letter commutator. The letter A and the numeral 1 are arranged on the same relay, the letter B and the numeral 2 on another relay and so forth. The relays also actuate as many studs which stop a carriage integral with the type wheel 79. This carriage which allows of a letter or numeral being struck consists of an abutment $95^A$ which stops the wheel 79 by a recessed stud, a contact-carrier element $95^B$ insulated from the mass or earth and connected electrically by means of brushes to a striking electromagnet 97, and an abutment piece $95^C$ pinned on to the spindle on which the stoppage of the wheel 79 and the closure of the striking current is produced. These three elements are held apart by springs, not shown in the drawings. The spring separating $95^A$ from $95^B$ being weaker than the spring separating $95^B$ from $95^C$ in such a way that on $95^A$ being stopped by a stud, $95^B$ just abuts against $95^A$ before $95^C$ contacts with $95^B$ in order to close the striking circuit.

In this position the wheel 79 positions the letters to be struck on each stoppage.

In the case of a numeral or punctuation mark for which the signal comprises 5 or 6 signs an interlocking piece $95^D$ engages between $95^A$ and $95^B$ preventing $95^B$ from approaching $95^A$ and releasing the wheel 79 by a sixtieth of a revolution in order to allow the numerals or punctuation signs to be struck instead of the letters. One numeral or one sign is arranged between each letter on this wheel 79 and thus there are sixty signs for only thirty studs.

The interlocking piece $95^D$ is actuated by an electromagnet, not shown in the drawings, the circuit of which is closed through one of the spindles of the fifth group $E_5$ of the letter commutator by means of a connection adjacent the terminal 1 of the letter commutator.

The locking element $95^D$ remains in the operative position until the striking has been effected and returns to rest immediately under the action of a spring, not shown in the drawings, in order to allow a letter to be struck.

In order to give a clear explanation of the part played by the three elements of the apparatus described above, which form the automatic recorder of the invention, the operation of the whole arrangement will be described below for the reception of, for example, the letter A which in the Morse code is represented by a short signal followed by a long signal (. —).

On receiving a short signal the regulator elements come into play as has been described above and a current passing through the contact 1 of the signal distributor 23, the spring 1 and the contact .1 of the signal selector reaches the terminal .1 of the relay $E_{1c}$ of the letter commutator. This relay $E_{1c}$ is locked in the operative position and closes the first group 42 of the letter A.

On receiving the long signal a current passes through the contact 2 of the signal distributor, the spring 2 of the signal selector and the contact —2, and reached the relay $E_{2_1}$ of the letter commutator. This relay is locked in the operative position and closes the second break 43 of the letter A. The commutator $E_{2_1}$ opens the circuit of the letter E at 33 which was ready for impression provided a sufficient interval had occurred. The short signal and the long signal received being classified on the letter commutator, the regulator estimates the silence which follows these two signals and closes a circuit through the terminal $1^L$ of the letter commutator. A current passes through the wire 44, the two contacts 45 and 46, contacts 43 and 42 and reaches the relay of the printing machine corresponding to the letter A which is consequently printed on the strip.

At the same time as the striking mechanism is being prepared the whole system returns to the position of rest in order to sort out the following signals.

The automatic recorder may be arranged to transcribe Morse signals or any other signals such as those known under the name of recorder signals.

Figure 3:
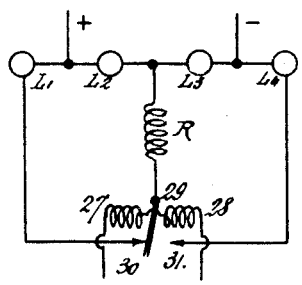
Figure 3 is a diagram of the connections of the regulator when receiving Morse signals.

In the first case for the reception of Morse (dashes and dots) the winding of the manipulator R of the polarized relay 7, 8 of the regulator is arranged as shown in the diagram in Figure 3, that is to say it is traversed by the current from the local source under the control of a sensitive relay actuated by the receiving system. The sensitive relay, the coils 27 and 28 of which are traversed by the receiving currents, controls the armature 29 which, in the position of rest abuts against the contact 30 and closes the circuit in the electromagnet R through the positive pole of the local source of current, the lamp $L_1$, contact 30, the electromagnet R, the lamp $L_3$ and the negative pole. When a signal is being received the armature 29 abuts against the contact 31 and the direction of the current in the winding R is reversed. It thus passes through the positive pole, $L_2$, R, 31, $L_4$, and the negative pole. This reversal of the current in the relay R on each signal actuates the regulator and the transcriber as has been explained above.

Figure 4:
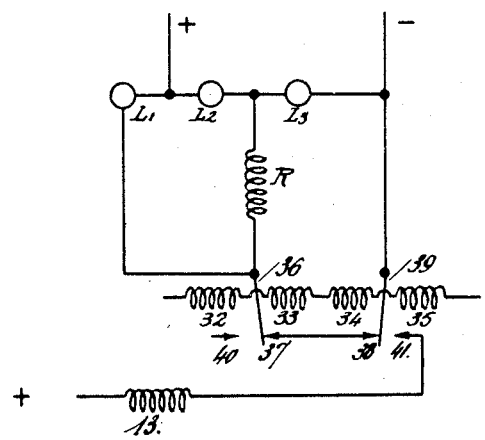
Figure 4 is a diagram of the connections of the regulator when receiving recorder signals.
Figure 5:
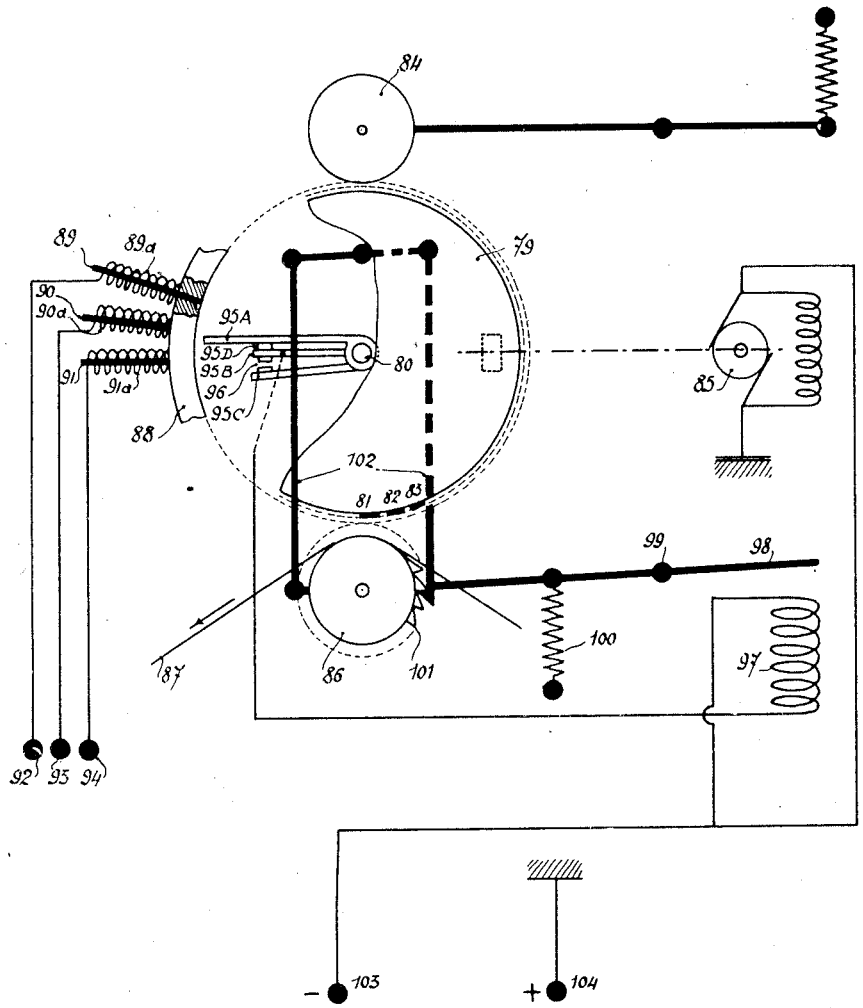
Figure 5 shows diagrammatically the improved printing machine.

In a case of receiving recorder signals used for telegraphic cables in which reception the long signs of the Morse alphabet are replaced by short signs in the opposite direction, the device is arranged and operates as follows:

The controlling winding R of the polarized relay of the regulator is connected as is shown diagrammatically in Figure 4, that is to say, it is traversed by the current from the local source under the control of two polarized sensitive relays actuated by the receiving system. The windings 32, 33, 34, 35 of the polarized sensitive relays are mounted in series on the line and are regulated so that one is sensitive say to positive signals and the other to negative signals. If no current is passing through the cable the two relays are in the position of rest and the local current passes through the positive pole $L_2$, R, the armature 36, the contact 37, the contact 38, the armature 39 and the negative pole. For a positive signal the current will be reversed in R thus passing through the negative pole, $L_1$, R, $L_3$, the negative pole (36 being on 40). The regulator will engage, as for a short signal, the short spindle of the first group of the letter commutator. For a negative sign the current will be reversed in R by the armature 39 of the second polarized relay of the line passing over to 41. This armature connects moreover the negative pole to the electromagnet 13 of the signal selector 25 by the contact 41. This signal selector diverts on the corresponding dash armature of the letter commutator, the current diverted by the signal distributor in the same manner as if dealing with a dash.

The classification of the signs of the letter commutator and printing are effected in the same manner as for Morse signals.

For recorder signals the abutment 41 of the relay sensitive to negative signals is merely connected to the terminal N of the regulator which is connected to the electromagnet 13.

In a case where recorder signals are blocked together, that is to say, when a series of short signs of the same nature are grouped into a long sign of this nature, the regulator is modified in the following manner.

The abutment 21 controlling the arrangement mounted on the spindle X, X′ no longer locks this arrangement in the operative position so that this arrangement turns during the duration of a long signal in order to engage as many armatures of the letter commutator as the signal comprises short signals. By this means the spur of the abutment does not act on this element 21.

The position of the sliding brushes of the signal distributor is corrected on each reversal of current by a stoppage of this distributor on the rest abutment of the element 21.

I declare that what I claim is:—

1. An automatic transcriber and recorder of telegraphic signals comprising in combination a local source of electrical energy, an electric regulator sorting out the signs of the signals received and also the intervals between the signs, said regulator including a signal distributor a switcher co-operating with said distributor in order to obtain current from said local source and a sign selector having oscillating contact co-operating with fixed contacts, a letter commutator formed by a series of relays actuated by the current transmitted by said signal selector from said regulator and a printing machine having relays actuated by the current transmitted by said regulator and said letter commutator to print the letters corresponding to the signals received on a band.

2. In a printing telegraph, in combination, a selector comprising means responsive to telegraphic signals, said selector also comprising a pair of spaced disks, means associated therewith for determining the duration of signals and silent intervals, a third disk selectively engaging each of said pair of disks to actuate the same, and a polarized relay for moving said third disk into engagement alternatively with one disk when signals are received and with the other disk when there are spaces between the signals.

3. In a printing telegraph, a selector comprising a pair of spaced disks, a third disk constantly driven, and adapted to be shifted to selectively engage said pair of disks to rotate the same, and a polarized relay having a pivoted armature adapted to shift said third disk.

4. In a printing telegraph, a selector comprising a pair of spaced disks, a third disk constantly driven and adapted to be shifted to selectively engage said pair of disks to rotate the same, a relay having a movable armature adapted to shift said third disk, a rotatable commutator, and escapement mechanism actuated by said movable armature to control the rotation of said commutator.

5. In a printing telegraph, a selector comprising a pair of spaced disks, a third disk constantly driven and adapted to be shifted to selectively engage said pair of disks to rotate the same, a relay having a movable armature adapted to shift said third disk, a rotatable commutator, brushes engaging the contacts of said commutator, escapement mechanism actuated by said movable armature to control the rotation of said commutator, and a multiple switch controlled by rotation of one of said pair of disks and adapted to open and close the circuits through said brushes.

6. In a printing telegraph, a selector comprising a pair of spaced disks, a third disk constantly driven and adapted to be shifted to selectively engage said pair of disks to rotate the same, a relay having a movable armature adapted to shift said third disk, a first rotatable commutator, brushes engaging the contacts of said first commutator, escapement mechanism actuated by said movable armature to control the rotation of said first commutator, a multiple switch controlled by rotation of one of said pair of disks and adapted to open and close the circuits through said brushes, and a second rotatable commutator rotating with the first, adapted to block in working position the said multiple switch during the passage of the brushes on the contacts of the first rotatable commutator.

7. In a printing telegraph, a selector comprising a pair of spaced disks, a third disk constantly driven and adapted to be shifted to selectively engage said pair of disks to rotate the same, a relay having a movable armature adapted to shift said third disk, a first rotatable commutator, brushes engaging the contacts of said first commutator, escapement mechanism actuated by rotation of said first commutator a multiple switch controlled by rotation of one of said pair of disks and adapted to open and close the circuits through said brushes, a second rotatable commutator rotating with the first adapted to block in working position the said multiple switch during the passage of the brushes on the contacts of the first rotatable commutator and a rotating contact controlled by a spring at each space between letters, adapted to close a circuit through a sole of the brushes of the first rotatable commutator.

ROBERT EMILE MARIE PÉNOT.